March 12, 1940.  B. F. PARR  2,193,601
ELECTRIC APPLIANCE HINGE
Filed Aug. 12, 1938   2 Sheets-Sheet 1
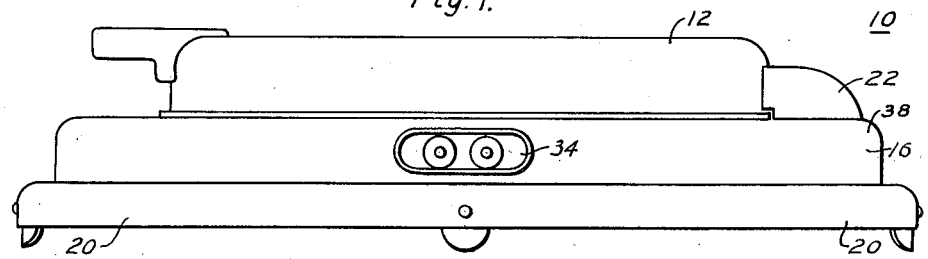
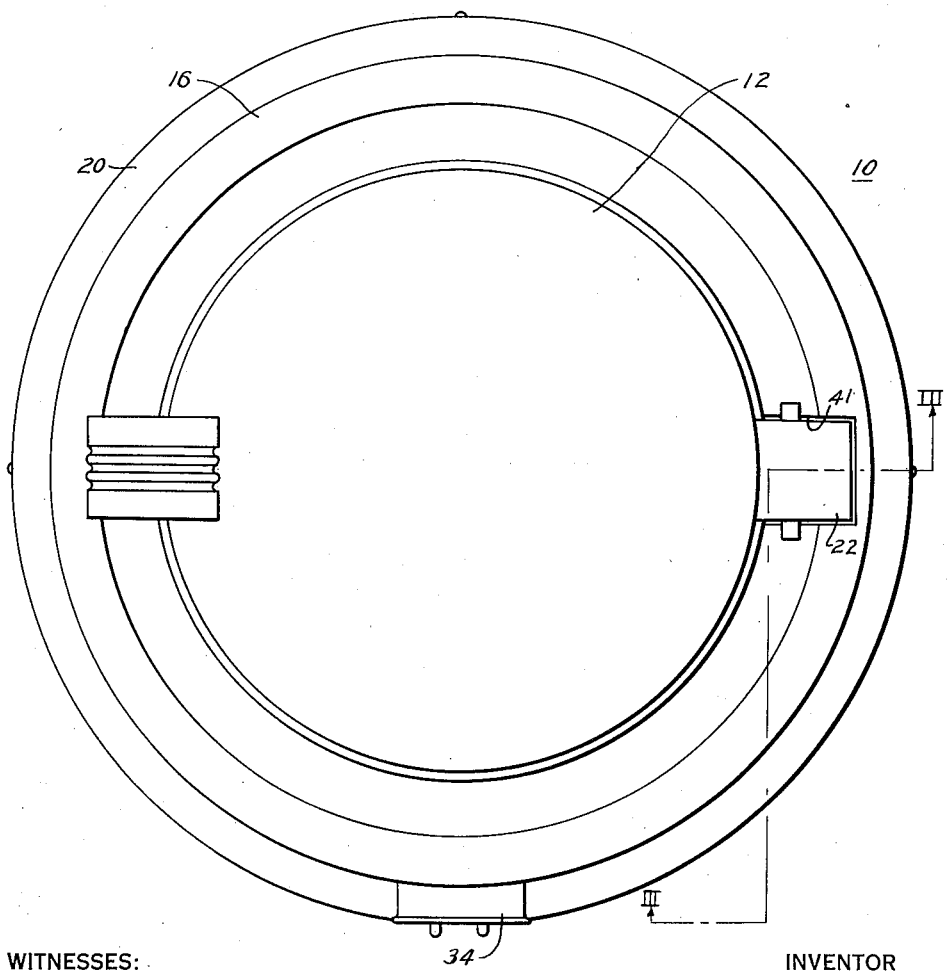
WITNESSES:
N. F. Susser
N. C. Hepler
INVENTOR
Bernard F. Parr
BY
W. R. Coley
ATTORNEY March 12, 1940.　　　B. F. PARR　　　2,193,601
ELECTRIC APPLIANCE HINGE
Filed Aug. 12, 1938　　　2 Sheets-Sheet 2
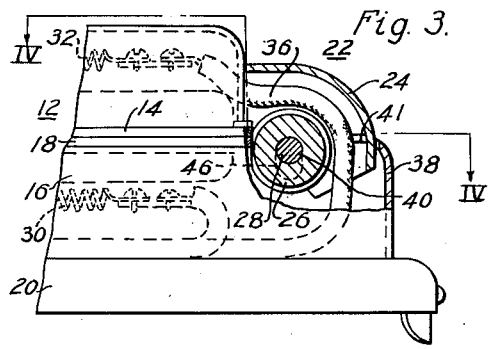
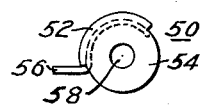
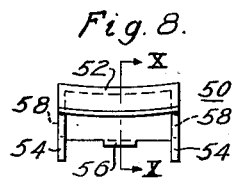
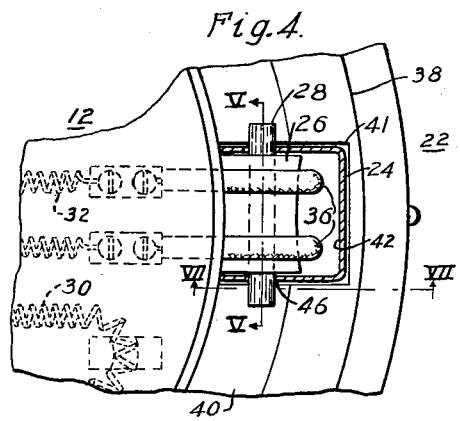
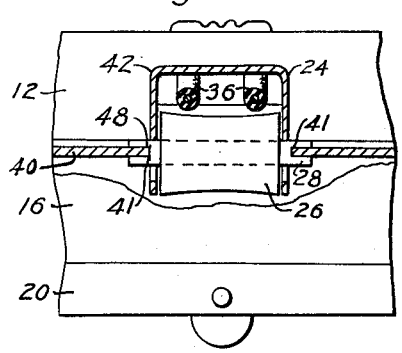
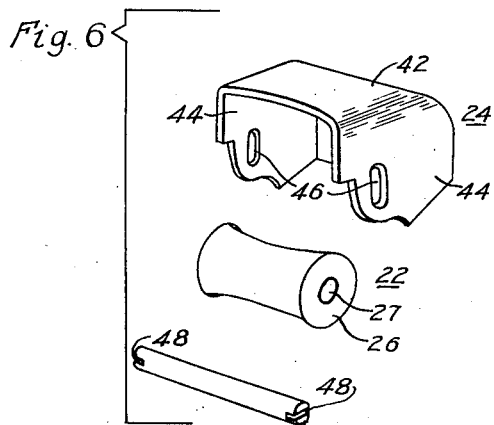
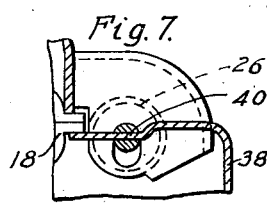
WITNESSES:
N. F. Susan
K. G. Hepler
INVENTOR
Bernard F. Parr
BY
W. R. Coley
ATTORNEY Patented Mar. 12, 1940

2,193,601

UNITED STATES PATENT OFFICE 2,193,601

ELECTRIC APPLIANCE HINGE

Bernard F. Parr, Mansfield, Ohio, assignor to Westinghouse Electric & Manufacturing Company, East Pittsburgh, Pa., a corporation of Pennsylvania Application August 12, 1938, Serial No. 224,543

12 Claims. (Cl. 53—10)

My invention relates to electric appliances and more particularly to hinges for waffle irons, sandwich grills or the like.

The modern trend in styling of appliances, such as waffle irons and sandwich grills, indicates the need of a symmetrical or even balance of the exterior appearance thereof. The present appliance hinges do not readily lend themselves to such design tendencies, but on the contrary have had a definite retarding action thereon.

It is, therefore, an object of my invention to provide a hinge adapted to be used with an appliance having a cooking surface, such as a waffle iron or sandwich grill, in which the bottom casing thereof extends a substantial distance beyond the cooking surface of such appliance, permitting such appliance to be shaped in the desired manner.

A further object of my invention is to provide a hinge, for use with an appliance having a cooking surface, adapted to prevent spillage from the cooking surface from entering the hinge.

Another object of my invention is to provide an appliance having a cooking surface, including an intermediate member having an exterior configuration complementary to that of the edge of the cooking surface whereby such member will enclose the hinge, when the appliance is open, and prevent spillage from the cooking surface from entering the hinge.

A further object of my invention is to provide a rugged, inexpensive appliance hinge comprising a minimum number of operating parts.

Other objects of my invention will either be pointed out specifically in the course of the following description of a device embodying my invention, or will be apparent from such description.

In the accompanying drawings,

Figures 1 and 2 are, respectively, an elevational and a top plan view of a device embodying my invention, Fig. 3 is a partial sectional view taken along the line III—III of Fig. 2, Fig. 4 is a sectional view taken along the line IV—IV of Fig. 3, Fig. 5 is a partial sectional view taken along the line V—V of Fig. 4, Fig. 6 is an exploded view of the hinged mechanism embodying my invention, Fig. 7 is a sectional view taken along the line VII—VII of Fig. 4, Figs. 8 and 9 are, respectively, side elevational and end views of a modified form of an intermediate member, and Fig. 10 is a sectional view taken along the line X—X of Fig. 8 showing the intermediate member in cooperation with a cooking surface.

Referring to the accompanying drawings, I show an electric appliance, in this instance a waffle iron 10, having a movable top working portion 12, including a movable cooking plate or surface 14, a stationary lower working portion 16, including a stationary cooking plate or surface 18, a supporting base 20, an annular ring 38, and a hinge structure 22. The hinge structure 22 comprises a hinge bracket 24 attached to the movable portion 12 and operatively associated with the stationary portion 16, as hereinafter set forth, a roller or intermediate member 26, and a pin or hinge member 28 operatively associated with the bracket 24, member 26 and the ring 38.

Suitable heating elements 30 and 32 are positioned within the stationary portion 16 and the movable portion 12 in a familiar manner so that they will readily heat the cooking plates or surfaces 18 and 14, respectively. The heating elements 30 and 32 may be rigidly attached within their respective portions, in any suitable manner and may be operatively associated with a power supply (not shown), through a suitable receptacle 34 operatively associated with the stationary portion 16, as shown in Figs. 1 and 2. The heating element 32 positioned within the movable portion 12 is operatively associated with the receptacle 34 by means of flexible conductors 36 which extend through the hinge structure 22 substantially as hereinafter described and as shown in Figs. 3, 4 and 5.

The movable portion 12, including the movable cooking plate or surface 14, may be considered as being a separate heating unit hingeably attached to the lower heating unit or cooking plate 18 and the supporting structure 20 by means of the hinge structure 22. In addition, the movable portion 12 is removably attached to the lower portion 16 and supporting structure 20 by means of the hinge structure 22, as hereinafter described.

The lower or stationary portion 16 comprises primarily the lower stationary cooking plate or surface 18, the annular depending ring 38 and the supporting structure 20. The cooking plate or surface 18 is rigidly attached to the supporting structure 20 by means of ring 38 in any desirable manner. The ring 38 has a depressed offset portion 40 positioned adjacent the stationary cooking plate 18 which serves primarily as the usual annular "batter ring" or trough to collect spillage which may overflow from the stationary cooking surface 18, see Figs. 4 and 7. A substantially rectangular slot or aperture 41 is positioned within the annular ring 38 extending from the innermost portion thereof, to receive and cooperate with the hinge structure 24, substantially as shown in Figs. 3, 4 and 5 and as hereinafter more fully described. The stationary cooking plate 18 is removably positioned within the annular ring 38, so that it may be readily removed therefrom to permit the hinge structure 22 to be positioned on the ring 38, substantially as hereinafter described.

The hinge structure 22 includes, in this instance, a hinge bracket 24, a roller, enclosing or intermediate insert member 26 and a pin 28. The bracket 24 is of a four-sided substantially cupped shaped having a downwardly sloping top and rear surface 42 and depending side portions 44 located on either side thereof. Vertically extending slots or apertures 46 are positioned in the depending side portions 44 to cooperate with the pin 28, substantially as hereinafter described. The upper end of the sloping top surface 42 is attached to the movable portion 12, as by spot welding, whereas the lower end thereof extends through the rectangular aperture 41 positioned within ring 38, as shown in Fig. 3.

The roller, intermediate insert or enclosing member 26, when adapted to cooperate with the circular cooking plates of a waffle iron, in the preferred form, as herein described, has substantially an "hour glass" or concave spool configuration, as shown in Figs. 4, 5 and 6. However, the radius of curvature of this configuration is substantially the same as the radius of the perimeter of the cooperating cooking plates 14 and 16 so that the two surfaces will be complementary, and in contact, as shown in Fig. 4. On the other hand, when the hinge structure 22 is incorporated with, say, a sandwich grill, with the cooking surfaces thereof being substantially rectangular, the roller or enclosing member 26 would be substantially straight-sided, that is, of cylindrical shape. By having the roller 26 of substantially the same configuration as that of the cooperating cooking plates 14 and 16, it is obvious that the two surfaces thereof will be complementary, and that the roller or enclosing member will contact the lower cooking plate throughout the entire length of such roller, which, in turn, prevents the roller from rotating. In addition, a small cylindrical aperture 27 extends through the roller 26 along the axis thereof to cooperate with pin 28 and to permit such roller to be mounted thereon, as hereinafter described.

If desired, the intermediate insert or enclosing member may be formed or stamped, as an incomplete enclosure, from a single sheet of metal as shown by 50 in Figs. 8, 9 and 10. The insert or enclosing member 50 will then comprise substantially a sloping guard surface 52, depending ends 54, and a tongue or lug 56 which cooperates with the lower cooking surface or grid 18.

The guard surface 52, in this instance, merely extends along a portion of the member 50. However, such surface is formed (concave in this instance) so that it will be complementary to the edge of the cooking surface 18 and extends high enough above the cooking surface to prevent any spillage from entering into the hinge structure 22 and to enclose the hinge when the movable portion 12 is raised.

The depending ends 54 have apertures 58 located therein to cooperate with the pin 28 to permit such member to be mounted with the bracket 24.

The tongue 56 is integral with the member 50 and extends horizontally from the lower edge of the guard surface 50. The tongue 56 cooperates with a correspondingly-shaped notch 60 located within the cooking surface 18 to prevent any rotation of the member 50.

The pin 28 is primarily a small rod adapted to support roller, intermediate insert or enclosing member 26 or 50 and has positioned at both ends thereof a slotted notch 48 to cooperate with the ring 38 of the stationary portion 16. The pin 28 is somewhat longer than the width of the aperture 41 positioned within ring 38. However, the longitudinal distance between the notches 48 is substantially the same as the width of notch 41 to afford a desired fit therebetween. It, therefore, follows that when the lower cooking plate 18 is removed, the pin 28 may be slid within the notch 41, the notches 48 tightly fitting the edges of depressed trough 40 of ring 38, which determines the illustrated final position thereof, to attach the hinge structure 22 to the stationary portion 16.

In assembling the hinge structure embodying my invention, the hinge bracket 24 is rigidly attached to the movable portion 12 in any suitable manner, as by spot welding. The roller 26 or intermediate insert member 50 is then positioned within the bracket 24 whereupon the pin 28 is inserted through apertures 46 and the aperture 27 located within the roller 26, for example. The roller 26 or intermediate insert member 50 will then be rotatably mounted within the bracket 24 upon the pin 28, and such pin and roller or intermediate member will be free to move vertically with respect to the bracket 24, or vice versa, on account of the slots 46 being longer than the diameter of pin 28.

With the roller 26 and pin 28 positioned within bracket 24, as hereinabove described, the movable portion 12 including such hinge structure is located over the ring 38, with lower cooking plate 18 removed and the pin 28 is properly positioned in line with the aperture 41 therein. The notches 48 located in the ends of pin 28 will then permit the hinge structure to be slid back along the trough 40 until the pin 28 strikes the outermost portion thereof, see Fig. 7. The lower or stationary cooking plate 18 is then positioned within the stationary ring 38 and, if desired, rigidly attached thereto in any suitable manner, as by spot welding, whereupon such plate will, inasmuch as the outer edge thereof is complementary to the configuration of the roller 26, contact enclosing member or roller 26, as noted above, preventing the hinge structure 22 from moving in the plane of the stationary plate 18 and also preventing any rotation of the roller.

With respect to the second form of my invention (Figs. 8, 9 and 10) the intermediate insert member 50 is placed in position and pin 28 positioned within the bracket 24, the hinge structure, then being mounted upon the ring 38 as hereinabove described. However, as the cooking plate 18 is positioned on the ring 38 so as to contact the complementary surface 50, the tongue 56 is positioned within the notch 60 to prevent any rotation of the insert 50.

Inasmuch as the apertures 46, located in hinge bracket 24, are elongated and slightly larger than the diameter of the pin 28, the movable portion 12 of the appliance 10, including hinge bracket 24 rigidly attached thereto, will be free to rotate about the pin 28 as an axis. The enclosing member may or may not rotate about pin 28. In addition, the vertically slotted configuration of the apertures 46 will permit the movable portion 12 and the hinge bracket 24 to be moved vertically with respect to the roller 26 or intermediate insert member 50, pin 28 and stationary portion 16. This relative movement permits material of varying thicknesses to be positioned between the cooking plates or surfaces 14 and 18 and ensures a uniform pressure thereon.

The hinge enclosing members, such as roller 26 or intermediate member 50 function as a conductor support, as well as a device for preventing spillage from entering the hinge structure. The conductors 36, which connect the heating element 32 in the movable portion 12 to receptacle 34, extend through the stationary portion 16, over the enclosing member to the heating element 32, see Figs. 3, 4 and 5. The hinge structure 22 thus provides mechanical protection for the conductors while permitting the conductors to be loosely positioned therethrough.

It is, therefore, obvious that the appliance hinge structure 22, including either the roller 26 or member 50, hereinabove described permits an electrical appliance, such as a waffle iron or sandwich grill or the like, to have the bottom casing thereof extend beyond the upper or movable portion thereof any desirable amount, thereby permitting the exterior configuration of the appliance to be formed into desirable artistic styles or shapes.

It is to be understood that the use of the term insert in the appended claims is to include either the roller 26 or intermediate member 50 or any other suitable enclosing member which will prevent spillage from entering into the hinge structure 22, as the appliance is repeatedly opened.

Various other modifications may be made in the device embodying my invention without departing from the spirit and scope thereof, and I desire, therefore, that only such limitations shall be placed thereon as are imposed by the prior art and the appended claims.

I claim as my invention:

1. An electrical cooking device including a pair of cooking surfaces and a hinge structure connecting the surfaces comprising a hinge member and an insert mechanically distinct from said surfaces and mounted upon and adapted to enclose the hinge member, to prevent spillage from the cooking surfaces from entering the hinge structure.

2. An electrical cooking device including, in combination, a supporting structure, a pair of cooking surfaces, at least one of the surfaces being movable, and a hinge structure connecting the surfaces comprising a pin operatively associated with the supporting structure and an insert mounted upon said pin, adapted to enclose the hinge pin to prevent spillage from the cooking plates from entering the hinge structure.

3. An electrical cooking device including, in combination, a supporting structure, a pair of cooking surfaces at least one of the surfaces being movable, and a hinge structure connecting the surfaces comprising a hinge bracket attached to the movable surface and operatively associated with the supporting structure, a pin operatively associated with the supporting structure and hinge bracket, and an insert mounted upon said pin, adapted to enclose the hinge pin to prevent spillage from the cooking plates from entering the hinge structure.

4. An electrical cooking device including, in combination, a supporting structure, a pair of cooking surfaces at least one of the surfaces being movable, and a hinge structure connecting the surfaces comprising a hinge bracket attached to the movable surface and operatively associated with the supporting structure, said hinge bracket being adapted to permit vertical movement of the movable cooking surface and bracket with respect to the stationary cooking surface and supporting structure to afford even contact pressure between the cooking surfaces and varying thicknesses of material placed therebetween, and a roller operatively enclosed within the bracket adapted to prevent spillage from the cooking plates from entering the hinge structure.

5. An electrical cooking device including, in combination, a supporting structure, a pair of cooking surfaces at least one of the surfaces being movable, and a hinge structure connecting the surfaces comprising a hinge bracket attached to the movable surface and operatively associated with the supporting structure, said hinge bracket being adapted to permit vertical movement of the movable cooking surface and bracket with respect to the stationary cooking surface and supporting structure to afford an even contact pressure between the cooking surfaces and varying thicknesses of material placed therebetween, a pin adapted to be slidably mounted upon the supporting structure and to be operatively associated with the bracket to determine its position with respect to the supporting structure, and an insert mechanically separable from said cooking surfaces and operatively mounted upon the pin within the bracket adapted to enclose the hinge pin to prevent spillage from the cooking plates from entering the hinge structure.

6. An electric cooking device including, in combination, an upper movable portion, a lower stationary portion having a substantially horizontal ledge which extends beyond the upper portion, a hinge structure operatively associated with the portions comprising a hinge bracket attached to the upper portion and adapted to move within a slot in the ledge of the lower portion.

7. An electric cooking device including, in combination, an upper movable portion, a lower stationary portion having a substantially horizontal ledge which extends beyond the upper portion, a trough positioned within the ledge of the lower portion for receiving spillage therefrom, a hinge structure operatively associated with the portions comprising a hinge bracket attached to the upper portion and adapted to move within a slot in the ledge of the lower portion.

8. An electrical cooking device comprising a pair of cooking surfaces including at least one stationary cooking surface, a hinge structure connecting the surfaces comprising a hinge member and a roller mounted thereon, the roller being complementary in shape to the edge of the stationary cooking surface and positioned in contact with the cooking surface to prevent spillage from the cooking surfaces from entering the hinge.

9. An electric cooking device including, in combination, an upper movable portion, a lower stationary portion having a substantially horizontal ledge which extends beyond the upper portion, a hinge structure operatively associated with the portions comprising a hinge bracket attached to the upper portion and a hinge member operatively associated with said bracket and secured to said ledge.

10. An electric cooking device including, in combination, an upper movable portion, a lower stationary portion having a substantially horizontal ledge which extends beyond the upper portion, a hinge structure operatively associated with the portions comprising a hinge bracket attached to the upper portion and adapted to move within a slot in the ledge of the lower portion and a hinge member operatively associated with said bracket and attached to the opposing edges of said slot.

11. An electric cooking device including, in combination, an upper movable portion, a lower stationary portion having a substantially horizontal ledge which extends beyond the upper portion, a hinge structure operatively associated with the portions comprising a hinge bracket attached to the upper portion and adapted to move within a slot in the ledge of the lower portion, a hinge member operatively associated with said bracket and attached to the opposing edges of said slot, and an insert adapted to enclose the hinge member to prevent spillage from the cooking surfaces from entering the hinge structure.

12. An electric cooking device including, in combination, an upper movable portion, a lower stationary portion having a substantially horizontal ledge which extends beyond the upper portion, a hinge structure operatively associated with the portions comprising a hinge bracket attached to the upper portion and adapted to move within a slot in the ledge of the lower portion, a hinge member operatively associated with said bracket and attached to the opposing edges of said slot, and an insert mounted upon the hinge member to prevent spillage from the cooking surfaces from entering the hinge structure.

BERNARD F. PARR.